Patented Mar. 31, 1931

1,798,547

UNITED STATES PATENT OFFICE

CHARLES V. McAVOY, OF CHICAGO, ILLINOIS, ASSIGNOR TO McAVOY PRODUCTS CO., OF CHICAGO, ILLINOIS, A CORPORATION OF ILLINOIS

ANTIFREEZE SOLUTION

No Drawing.   Application filed January 6, 1930.   Serial No. 418,996.

This invention pertains to solutions having a low freezing temperature suitable particularly for use in the cooling systems of internal combustion motors which are at times exposed to very low atmospheric temperatures such as might freeze a cooling fluid of the nature of water.

The solution made in accordance with this invention is particularly useful in the cooling systems of automobile and aeroplane motors. Many of the prior so-called "antifreeze" solutions, while protecting the cooling system from freezing, are objectionable because of the corrosive effect which they have on the metal parts of the cooling system. The solution made in accordance with this invention will not only properly perform its function as a cooling fluid incapable of freezing within the usual range of atmospheric temperatures, but it also prevents corrosion and as well prevents pitting of the metal surfaces.

The exact proportions of the several ingredients are subject to some variation within the scope of this invention, the portions herein stated being merely illustrative of one solution which is found to be entirely satisfactory. It is composed of five pounds of calcium chloride to each gallon of water, to which are added one gallon of an extraction of the juice of any of several species of cactus, including particularly, Spanish dagger, yucca, amole, sotol and lechugnia. The order in which the three ingredients are added is immaterial. The extraction of juices from the cactus plants may be conducted most conveniently by chopping the pulp of the leaves, stalk, and roots into small pieces to make every portion readily accessible to water, then placing the chopped pulp in a tank of water and preferably heating the water to boiling to promote rapid extraction of the juice. One-half pound of pulp to each gallon of water is found to give a solution of adequate strength for the purpose of this invention.

A solution made as above containing five pounds calcium chloride, one gallon of water, and one gallon of cactus solution prepared as above, will have a freezing point of about 52° F. below zero. It will have no corrosive effect upon the inside of an engine block or radiator and prevents pitting of the metal surfaces.

If desired, sodium chloride may be employed instead of calcium chloride, and in such a case also corrosion and pitting will be prevented. Lacking the presence of the cactus juice in either case, the calicum or the sodium chloride would promote corrosion of the engine block. The cactus juice not only prevents corrosion and pitting, but also is found to lower the freezing point of the solution.

It is an unfortunate fact that calcium or sodium chloride and other substances which give to a water solution a very low freezing point are also highly corrosive of the iron contained in the engine block. To any of these solutions, normally corrosive, cactus juice may be added thereby rendering the final solution non-corrosive of iron.

All of the ingredients which comprise the particularly described solution are very cheap, and when combined will form an anti-freeze solution entirely free from objectionable characteristics and which will be lower in price than many of the solutions now obtainable. Furthermore, should some of the water evaporate from this solution, the evaporated water may be replaced by fresh water at no expense, or by fresh quantities of the correctly proportioned solution at a very slight expense.

It should be understood that the proportions above mentioned are merely illustrative of one satisfactory form of the invention, and that these proportions, however, may be varied substantially and yet remain within the scope of the invention.

Having shown and described my invention, I claim:

1. An anti-freeze solution comprising a solution of calcium chloride, water, and juice extracted from a cactus plant.

2. An anti-freeze solution comprising calcium chloride dissolved in water in the proportion of five pounds to one gallon of water and mixed with one gallon of water containing juice extracted from a cactus plant.

3. An anti-freeze solution containing one ingredient which is strongly promotive of iron corrosion but which serves to lower the freezing point of the solution substantially below that of water, in combination with juice obtained from a cactus plant in quantities sufficient to render the entire solution non-corrosive of iron.

4. An anti-freeze solution comprising a water solution containing a salt for lowering the freezing temperature of the solution below 32° F. and containing juice extracted from the cactus plant in amount sufficient to render the entire solution non-corrosive of iron.

In witness of the foregoing I affix my signature.

CHARLES V. McAVOY.